United States Patent [19]

Ito et al.

[11] Patent Number: 4,536,267

[45] Date of Patent: Aug. 20, 1985

[54] PLASTIC LENS OF NEOPENTYL GLYCOL DIMETHACRYLATE COPOLYMERIZED WITH METHOXY DIETHYLENE GLYCOL METHACRYLATE OR DIETHYLENE GLYCOL DIMETHACRYLATE

[75] Inventors: Akio Ito, Katano; Shunsuke Matsuda, Osaka; Yoshinobu Murakami, Katano; Tooru Tamura, Ikeda, all of Japan

[73] Assignee: Matsushita Electric Industrial Co., Ltd., Osaka, Japan

[21] Appl. No.: 482,311

[22] Filed: Apr. 1, 1983

[51] Int. Cl.$^3$ .................... C08F 120/10; C08F 220/10
[52] U.S. Cl. ................. 204/159.23; 526/313; 526/323.2; 526/323.1
[58] Field of Search ............. 526/320, 34, 313, 323.1

[56] References Cited

U.S. PATENT DOCUMENTS

| | | | |
|---|---|---|---|
| 2,951,758 | 9/1960 | Notley | 526/320 |
| 3,030,349 | 4/1962 | Stickney | 526/321 |
| 3,125,480 | 3/1964 | Karo | 526/320 |
| 3,515,656 | 6/1970 | Huang et al. | 526/320 |
| 3,850,892 | 11/1974 | Shen et al. | 526/320 |
| 4,174,311 | 11/1979 | Nakano et al. | 526/320 |
| 4,273,799 | 6/1981 | Kamada et al. | 526/320 |
| 4,351,708 | 9/1982 | Berner et al. | 204/159.23 |
| 4,352,723 | 10/1982 | Morgan | 204/159.23 |

FOREIGN PATENT DOCUMENTS 57-30769  2/1982  Japan ................ 526/323.1

*Primary Examiner*—Joseph L. Schofer
*Assistant Examiner*—Peter F. Kulkosky
*Attorney, Agent, or Firm*—Wenderoth, Lind & Ponack

[57] ABSTRACT

There are provided acrylic plastic lenses having a wide range of refractive indices as well as excellent physical and optical properties by polymerization of specific acrylic monomers in the presence of a photopolymerization initiator and a thermal polymerization catalyst.

3 Claims, No Drawings

PLASTIC LENS OF NEOPENTYL GLYCOL DIMETHACRYLATE COPOLYMERIZED WITH METHOXY DIETHYLENE GLYCOL METHACRYLATE OR DIETHYLENE GLYCOL DIMETHACRYLATE

BACKGROUND OF THE INVENTION

1. Field of the Invention

This invention relates to a plastic lens.

2. Description of the Prior Art

Plastic lens as have been widely used because they are lightweight, can be mass produced, and are generally low in manufacturing cost compared to conventional glass lenses. Materials for the casting of plastic lenses now in general use are diethylene glycol bis-allyl carbonate (to be hereinafter called CR-39) and the so-called acryl syrup of methyl methacrylate as the main constituent, and for the injection molding, polymethyl methacrylate (to be hereinafter called PMMA) and polycarbonate. The plastic lens materials in practical use are fairly fewer in kind than the conventional glass lens materials of which these are 200 or more kinds in total for casting and injection molding materials. While glass lenses have a considerably wide variation in index of refraction, ranging from high to low and also in dispersion, the plastic lens materials few in kind and have an index refraction of about 1.49 to 1.50 (exclusive of polycarbonate) i.e. much narrower width than for glass lenses, which is largely problematical for designing plastic lenses. For example, the lens for glasses smaller in index of refraction then the glass lens leads to a larger center thickness or curvature, thereby giving the appearance to a user different from that for glasses made of glass. Besides a combination of lenses different in the index of refraction or dispersion are used in camera lenses or microscope lenses for the purpose of eliminating various aberrations, such as chromatic, coma and spherical aberrations. Such method, however, is difficult to use with the plastic lens because of the few kinds thereof. Under these circumstances, other than the plastic lens of material now in use, those of various indexes of refraction or dispersions, such as high index or conversely low index of refraction, have earnestly been desired.

The plastic lens of PMMA, among plastic lens materials now in use, has a light transmission factor of about 92% in the region of visible light of wavelength of 400 to 700 mμ and also is made of a resin for general use and of a relatively low manufacturing cost, thus enjoying wide use. However, the PMMA has the largest drawback in low anti-breakage ability so that an improvement thereof has been an important object.

On the other hand, from the viewpoint of the resin molding, in case of manufacturing the plastic lens by the injection molding, while it is advantageous in the fairly short time taken for the molding in comparison with the casting, there are drawbacks fundamental for the injection molding such that optical strain caused by molecular orientation of resin is generated in the lens, the lens is easily flawed due to the use of thermoplastic resin, the heat-resistance temperature is limited, and materials usable for injection molding are restricted.

On the contrary, in the case of manufacturing the plastic lens by the casting, the blending is selected relative to a degree of freedom to thereby permit manufacture of lens having a desired index of refraction. On the other hand, it takes much time to cure liquid materials, for example, the CR-39 requires several tens of hours for curing.

In order to eliminate the above defect in the casting, an attempt has been made to cure resin by irradiation with ultraviolet rays to manufacture the plastic lens. This method employs a photosetting type resin containing as the main constituents a transparent compound, e.g., methyl methacrylate, transparent with respect to the visible light and photopolymerization initiator transparent with respect to the visible light, the photosetting resin being poured into a transparent mold having a desired optical surface, and thereafter the ultraviolet rays are radiated to the resin through the transparent mold to thereby cure the photosetting resin. In this case, however, the cured resin generally changes in color from colorless to yellow following the curing. If the coloration becomes a large drawback to the performance of lens, the plastic lens having used the photosetting resin is not practical. Hence, a plastic lens has been keenly desired which employs a photosetting resin and which, when cured, creates no coloration during the curing by the ultraviolet ray radiation.

SUMMARY OF THE INVENTION

In the light of the above problems, this invention has been arrived at.

An object of the invention is to provide a plastic lens of various indexes of refraction.

Another object of the invention is to provide a plastic lens having the index of refraction higher than that of the plastic lens of PMMA or CR-39.

Still another object of the invention is to provide a plastic lens of a material having an index of refraction equivalent to PMMA or CR-39 and improved in anti-breakability: the drawback of PMMA.

A further object of the invention is to provide a plastic lens using a photosetting resin free from coloration.

This invention provides plastic lenses of various indexes of refraction and the following plastic lenses: a plastic lens of higher index of refraction than PMMA or CR-39, obtained by polymerizing 2,2-bis(4-acryloyl oxypolyethylene oxyphenyl)propane by use of at least one of a thermal polymerization catalyst and a photopolymerization initiator; that having an index of refraction equivalent to that of PMMA or CR-39 and improved in anti-breakability compared to PMMA by polymerizing neopentyl glycol diacrylate or neopentyl glycol dimethacrylate with a polymerization initiator the same as the above; and that having various indexes of refraction by adjusting the blending ratio and by copolymerizing a mixture constituent group of a first monomer of diethylene glycol dimethacrylate, a second monomer of methoxy-diethylene glycol methacrylate and a third monomer thereof with the polymerization initiator the same as the above. On the other hand, a plastic lens of non-coloration is obtainable by the use of a photosetting resin together with methyl ethyl ketone peroxide as the thermal polymerization catalyst.

DETAILED DESCRIPTION OF THE INVENTION

The invention will be described corresponding to the aforesaid objects thereof. This invention is constituted by the following four items: (I) The plastic lens of higher index of refraction than PMMA or CR-39 can be obtained by polymerizing 2,2-bis(4-acryloyl oxypolyethylene oxyphenyl)propane in liquid at the normal temperature, capable of casting molding, and given by the following structural formula:

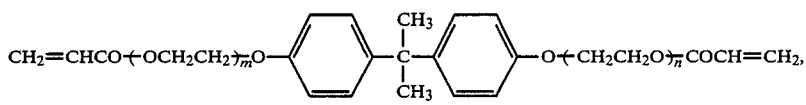

(i)

where m and n are integers, and the sum of m and n is 3 to 4.

As understood from the above structural formula, 2,2-bis(4-acryloyl oxypolyethylene oxyphenyl)propane is a monomer having bifunctionality and thermosetting properties so as to be of network structure upon polymerization, whereby the thermal polymerization catalyst or photopolymerization initiator is usable as the polymerization initiator. As suitable thermal polymerization catalysts are, for example, t-butyl peroxybenzoate, benzyl peroxide, methyl ethyl ketone peroxide. t-butyl cumylperoxide, di-t-butyl peroxide, diisopropyl peroxydicarbonate, t-butyl peroxy octoate, or other organic peroxide. As suitable photopolymerization initiators are, for example, benzoin isopropyl ether, benzoin ethyl ether, benzoin isobutyl ether, α-aryl benzoin, α-methyl benzoin, benzophenone, benzyl, or 2-ethyl anthraquinone. These photopolymerization initiators, when in use, are usable alone or together with the thermal polymerization catalyst for effectively utilizing heat generated from a lamp radiating the ultraviolet rays.

The plastic lens of the invention is superior in crazing resistance to the plastic lens produced by polymerization of PMMA. 2,2-(4-acryloyl oxypolyethylene oxyphenyl)propane is of relatively low viscosity and good transferability, thereby having no need for subsequent grinding. As shown in the embodiments to be discussed below, the polymerization of 2,2-bis(4-acryloyl oxypolyethylene oxyphenyl)propane requires several hours with the use of a thermal polymerization catalyst and several minutes with the use of a photopolymerization initiator. Hence, the time required for one cycle of lens molding can largely be diminished.

In addition, in order to facilitate mold release, a well-known mold release agent need only be preliminarily coated on the surface of mold, or an inner mold release agent, such as an organic phosphoric ester group surface-active agent or gluconic acid alkylamine salt need only be added to the resin. The obtained plastic lens, as aforesaid, is subjected only to the outer peripheral processing to be usable for glasses, microscopes or cameras, but, if need be, grinding or surface treatment is applicable. In other words, the grinding can smooth the surface or form an aspherical surface, and the surface treatment can improve the surface hardness or chemical-proof property and form a lens coating. (II) The plastic lens having an index of refraction equivalent to PMMA or CR-39 lens and improved in anti-breakage capability; a drawback in PMMA, is obtainable by polymerizing neopentyl glycol diacrylate or neopentyl glycol dimethacrylate, liquid at a normal temperature, applicable of in casting molding, and given by the following structural formula:

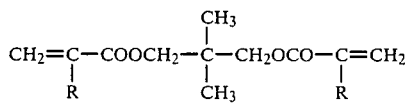

(ii)

where
  R: hydrogen or methyl group; with hydrogen, neopentyl glycol diacrylate and with a methyl group, neopentyl glycol dimethacrylate.

As seen from the above formula, the neopentyl glycol diacrylate or neopentyl glycol dimethacrylate is a monomer of bifunctionality and is thermosetting thus forming a network structure upon polymerization. Accordingly, the thermal polymerization catalyst or photopolymerization initiator as the polymerization initiator is usable in the same way as in the above item (I), the thermal polymerization catalyst or photopolymerization initiator, the same as in Item (I), can be used together and also solely.

The neopentyl glycol diacrylate or neopentyl glycol dimethacrylate is of low viscosity and good transferability, thereby being largely advantageous in not needing grinding as a subsequent process. The polymerization requires several hours with the use of thermal polymerization catalyst and several minutes with a photopolymerization initiator, thus largely reducing the time required for one cycle of lens molding in comparison with the lens of CR-39.

In addition, it is possible to use a well-known mold release agent and carry out the grinding and surface treatment as in Item (I). (III) The plastic lens obtained by copolymerizing a first monomer of diethylene glycol dimethacrylate in liquid at a normal temperature, capable of being casting-molded, and given by the following structural formula (iii), a second monomer of methoxydiethylene glycol methacrylate given by the following structural formula (iv), and a third monomer given by the following formula (v).

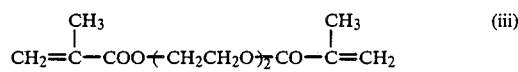

(iii)

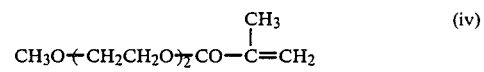

(iv)

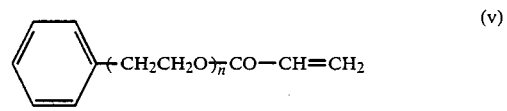

(v)

where n: integer of 1 to 5.

As seen from the above structural formulas, the polymerization initiator used in the copolymerization of the above substances can apply the thermal polymerization catalyst or photopolymerization initiator, the same as in item (I). The catalyst and agent of course are usable not only but solely but also together.

The first, second and third monomers can be blended at a desired ratio and copolymerized to obtain the plastic lenses of various indices of refraction, in which an especially preferable mixing ratio is as the first monomer of 30 to 50 wt %, the second and third monomers of 50 to 70 wt % in the sum, and the third monomer of 30 to 40 wt %, because the first monomer of diethylene glycol dimethacrylate, when 30 wt % or less, deteriorates gradually in heat resistance, and when 50 wt % or more, deteriorates in shock-proof property.

In addition, the well-known mold release agent can be used and the grinding and surface treatment are applicable the same as in Item (I). (IV) The plastic lens using a photosetting resin free from coloration is obtained by polymerizing the photosetting composition of main constituents comprising a compound containing a radical cross-linkable ethylenically unsaturated double bond and the photopolymerization initiator, together with methyl ethyl ketone peroxide in blend ratio of two times or more weight of photopolymerization initiator as the thermal polymerization agent.

The compound containing the radical crosslinkable ethylenically unsaturated double bond used for manufacturing the plastic lens of the invention can employ well-known photosetting liquid compounds, such as prepolymer or monomer, which should be strictly selected to meet the condition of being transparent to visible light of a wavelength of 400 to 700 m$\mu$. For this purpose, it is preferable to use a monomer distillation-refinable under normal or reduced pressure, for example, methyl methacrylate, methoxy-diethylene glycol methacrylate, neopentyl glycol dimethacrylate or diethylene glycol dimethacrylate, which is methacrylic acid ester of monofunctionality and bifinctionality well-known as a reaction diluent of the photosetting type. As a matter of course, it is possible for diminishing shrinkage during the setting to add to the above-mentioned compound of ethylenically unsaturated double bond resin, one of non-reactivity, for example, a thermoplastic resin, where, in consideration of the relation of phase solubility of each constituent in the setting substance, an additive tending to make the cured substance milky or cloudy after the setting, should be excluded.

The photopolymerization initiator used for the photosetting resin for manufacturing the plastic lens of the invention can use a well-known initiators, which should meet a condition of being transparent to the visible light of wavelength of 400 to 700 m$\mu$. Such photopolymerization initiator includes, for example, acetophenone, benzophenone, derivatives thereof, and benzoin alkyl ether, etc.

It is preferable for manufacturing the plastic lens of the invention to add to the photosetting resin methyl ethyl ketone peroxide at two times or more weight of photopolymerization initiator, because, if less than the above, intense yellowing will appear in the setting substance following the ultraviolet ray radiation to make the plastic lens useless.

DESCRIPTION OF EXAMPLES

EXAMPLE 1

A solution of t-butyl peroxy-benzoate at 2 parts by weight mixed and dissolved in 2,2-bis(4-acryloyl oxydiethylene oxyphenyl)propane of 100 parts by weight, was poured into a mold of casting type comprising two clean glass molds and a gasket. The solution was heated and cured for three hours at a temperature of 70° C. and then for two hours at 115° C. and released from the mold, thereby obtaining the plastic lens, which was of index of refraction ($n_D^{20}$) of 1.5633 and was a transparent lens of 3H pencil hardness.

EXAMPLE 2

Benzoin isopropyl ether at 2 parts by weight, benzoyl peroxide at 1 parts by weight, and "PURAI SAFU A207H" (commercial name of DAIICHI KOGYO CO., LTD.) for an organic phosphoric ester group surfactant at 3 parts by weight, were added to 2,2-bis(4-acryloyl oxydiethylene oxyphenyl)propane of 100 part-in-weight and then mixed uniformly. This solution was poured into the casting type mold comprising two clean glass molds and a gasket. The contents were irradiated with the ultraviolet rays at an interval of 15 cm for one minute by use of two high-pressure mercury-vapor lamps of 30 W/cm (Photo-polymerization mercury-vapor lamp of H1000 TQ×2 by Matsushita Electric Industrial Co., Ltd.), and then released from the mold after setting, thereby obtaining the plastic lens, which was of index of refraction ($n_D^{20}$) of 1.5633 and was a transparent lens of 3H pencil hardness.

EXAMPLE 3 t-Butyl peroxy-benzoate at 2 parts by weight was mixed and dissolved in neopentyl glycol diacrylate. This liquid was poured into the casting type molding comprising two clean glass molds and gasket, heated and cured at a temperature of 70° C. for three hours and then at 115° C. for two hours, and thereafter released from the mold, thereby obtaining the plastic lens, which was of index of refraction ($n_D^{20}$) of 1.4929 and was a transparent lens of 3H pencil hardness.

EXAMPLE 4

Benzoin isopropyl ether at 2 parts by weight, benzoyl peroxide at 1 parts by weight, and "PRAISAFU A207H" (commercial name of DAIICHI KOGYO CO., LTD.) for an organic phosphoric ester group surfactant of 3 parts by weight, were added to neopentyl glycol diacrylate of 100 parts by weight and mixed. This liquid was poured into the casting type mold comprising two clean glass molds and a gasket. The contents were irradiated with two high-pressure mercury-vapor lamps of 30 W/cm (2 polymerization mercury lamps of 1000TQ (by Matsushita Electric Industrial Co., Ltd.) at an interval of 15 cm for one minute and released from the mold after setting, thereby obtaining the plastic lens, which was of index of refraction ($n_D^{20}$) of 1.4929 and was a transparent lens of 3H pencil hardness.

EXAMPLE 5 t-Butyl peroxy benzoate of 2 parts by weight was mixed and dissolved in neopentyl glycol dimethacrylate of 100 part-in-weight. This liquid was poured into the casting type mold comprising two clean glass molds and a gasket. The content was heated and cured at a temperature of 70° C. for three hours and then at 115° C. for two hours and released from the mold after setting to thereby obtain the plastic lens, which was of index of refraction ($n_d^{20}$) of 1.4940 and was a transparent lens of 3H pencil hardness.

EXAMPLE 6

Benzoin isopropyl ether of 2 parts by weight, benzoyl peroxide of 1 parts by weight, were mixed and dissolved in neopentyl glycol dimethylacrylate at 100 parts by weight. The liquid was poured into the casting type mold comprising two clean glass molds and gasket. The content was irradiated with the ultraviolet rays at an interval of 15 cm every three minutes for both surfaces of mold, thereby obtaining the plastic lens, which was of index of refraction ($n_d^{20}$) of 1.4938 and was a transparent lens of 3H pencil hardness.

EXAMPLES 7 TO 9

A first monomer of diethylene glycol methacrylate, a second monomer of methoxy diethylene glycol methacrylate, and a third monomer, each of the predetermined amount, and methyl ethyl ketone peroxide of 0.5 parts by weight, were mixed and dissolved to make a transparent solution, which was poured into the casting type mold comprising two clean glass molds and a gasket. The solution was heated and cured at a temperature of 40° C. for ten hours, then at 70° C. for two hours, further at 100° C. for one hour, and lastly at 115° C. for one hour, and thereafter released from the mold, thereby obtaining the plastic lens. The obtained plastic lens was subjected to measurement of index of refraction, the viscosity and elasticity test and Izod impact test, the results of which will be shown in Table 1. Incidentally, the result of viscosity and elasticity is shown by modulus of elasticity at 25° C. and 50° C.

TABLE 1

| Example | 1st Monomer (Part-in weight) | 2nd Monomer (Part-in weight) | 3rd Monomer (Part-in weight) | Index of Refraction $\eta_d$ | Modulus of Elasticity 25° C. | Modulus of Elasticity 50° C. | Izod Impact Test (kg-cm/cm) |
|---|---|---|---|---|---|---|---|
| 7 | 33 | 34 | 33 | 1.5219 | $1.00 \times 10^{10}$ | $3.80 \times 10^{9}$ | 2.13 |
| 8 | 50 | 10 | 40 | 1.5342 | $1.20 \times 10^{10}$ | $8.80 \times 10^{9}$ | 1.74 |
| 9 | 50 | 20 | 30 | 1.5193 | $1.10 \times 10^{10}$ | $9.70 \times 10^{9}$ | 1.61 |

EXAMPLE 10

Neopentyl glycol dimethacrylate at 50 parts by weight, methoxy diethylene glycol methacrylate at 50 parts by weight, benzoin isopropyl ether at 0.5 parts by weight as the photopolymerization initiator, and methyl ethyl ketone peroxide at 1 parts by weight, were mixed and dissolved to make a transparent solution. The solution was sandwiched between glass plates at an interval of 3 mm by use of a silicon rubber gasket and was irradiated at both surfaces with the ultraviolet rays each for five minutes by use of a 1 kW high-pressure mercury vapor-lamp disposed apart from the object by 30 cm and then cured. Since the spectroscopic transmittivity curve at the visible wavelength range regarding the obtained cured object has been obtained, Table 2 shows, from the results of the above measurement, the transmittivity with respect to the light of wavelength of 420 m$\mu$ as an index of the extent of yellowing.

In the Table 2, it is seen that the larger the value (%) of transmittivity is, the smaller the extent of yellowing becomes.

In addition, the Table 2 includes comparison examples 1 through 9, in which the results of measuring characteristics by the use of various peroxides as the thermal polymerization catalyst instead of methyl ethyl ketone peroxide, are set forth.

Incidentally, the transparent plastic lens of composition obtained by this example showed a thermal deformation temperature (at a load of 18.56 kg/cm$^2$) of 102° C. and an index of refraction ($n_D^{25}$) of 1.4973.

TABLE 2

| | Thermal Polymerization Catalyst | Amount of addition (Part-in weight) | Transmittivity (%) |
|---|---|---|---|
| Example 10 | methyl ethyl ketone peroxide | 1 | 81 |
| Comparison Example 1 | 1,1-bis(t-butyl peroxy)-3,3,5-trimethyl cyclohexane | 2 | 43 |
| Comparison Example 2 | 4,4-bis-(t-butyl peroxy)n-pentanoic acid n-butyl | 2 | 44 |
| Comparison Example 3 | 2,2-bis-(t-butyl peroxy) butane | 1 | 32 |
| Comparison Example 4 | benzoyl peroxide | 2 | 72 |
| Comparison Example 5 | di-t-butyl peroxide | 2 | 48 |
| Comparison Example 6 | t-butyl cumylperoxide | 2 | 53 |
| Comparison Example 7 | t-butyl peroxide octoate | 2 | 46 |
| Comparison Example 8 | t-butyl peroxy benzoate | 2 | 53 |
| Comparison Example 9 | t-butyl peroxy isopropyl-carbonate | 2 | 45 |

EXAMPLES 11 THROUGH 17

Neopentyl glycol dimethacrylate at 50 parts by weight, diethylene glycol dimethacrylate at 50 parts by weight, and benzoin isopropyl ether as the photopolymerization initiator, and methyl ethyl ketone peroxide as the polymerization catalyst, in the predetermined amounts respectively, were mixed and dissolved to make a transparent solution. The solution was made into a specimen of 3 mm in thickness by the same method as in example 10.

Table 3 shows the amounts of photopolymerization initiator and thermal polymerization catalyst respectively used and the transmittivity of the obtained specimen with respect to light of 420 m$\mu$ wavelength.

As to the cured object obtained when no methyl ethyl ketone peroxide was added, the same characteristic as the above was obtained, whereby the comparison examples 10 through 13 in Table 3 show the results.

In addition, a transparent plastic obtained by the composition in Example 12 showed a thermal deformation temperature (at a load of 18.56 kg/cm$^2$) of 139° C. and the index of refraction ($n_D$) of 1.5016.

Although several examples have been described, they are merely exemplary of the invention and are not to be constructed as limiting, the invention being defined solely by the appended claims.

TABLE 3

| Example | Benzoin Isopropyl Ether (Part-in-weight) | Methyl Ethyl Ketone peroxide (Part-in-weight) | Transmittivity (at wavelength of 420 mm) (%) |
|---|---|---|---|
| 11 | 1 | 1 | 75 |
| 12 | 0.5 | 1 | 81 |
| 13 | 0.2 | 1 | 88 |
| 14 | 0.1 | 1 | 88 |
| 15 | 0.5 | 1.5 | 82 |
| 16 | 0.5 | 2 | 83 |
| 17 | 0.5 | 2.5 | 85 |
| Comparison example 10 | 1 | 0 | 45 |
| Comparison example 11 | 0.5 | 0 | 54 |
| Comparison example 12 | 0.2 | 0 | 67 |
| Comparison example 13 | 0.1 | 0 | 69 |

What is claimed is:

1. A plastic lens obtained by polymerizing neopentyl glycol dimethacrylate with methoxy diethylene glycol methacrylate or diethylene glycol dimethacrylate, said polymerization being performed in the presence of a photopolymerization initiator and a polymerization catalyst which is methyl ethyl ketone peroxide, the transmittivity of said lens being at least 75%.

2. The plastic lens according to claim 1 wherein the photopolymerization initiator is benzoin isopropyl ether, benzoin ethyl ether, benzoin isobutyl ether, α-aryl benzoin, α-methyl benzoin, benzophenone, benzyl, or 2-ethyl anthraquinone.

3. The plastic lens according to claim 2 wherein the photopolymerization initiator is benzoin isopropyl ether.

* * * * *